(12) United States Patent
Sparacino et al.

(10) Patent No.: US 6,747,552 B2
(45) Date of Patent: Jun. 8, 2004

(54) APPARATUS AND METHOD FOR TESTING AN ANTILOCK BRAKE SYSTEM

(75) Inventors: Steven J. Sparacino, Portage, MI (US); Jeff Patterson, Kalamazoo, MI (US)

(73) Assignee: SPX Corporation, Charlotte, NC (US)

( * ) Notice: Subject to any disclaimer, the term of this patent is extended or adjusted under 35 U.S.C. 154(b) by 157 days.

(21) Appl. No.: 10/024,395

(22) Filed: Dec. 21, 2001

(65) Prior Publication Data

US 2003/0080856 A1 May 1, 2003

Related U.S. Application Data

(60) Provisional application No. 60/330,508, filed on Oct. 23, 2001.

(51) Int. Cl.[7] .................. B60Q 1/00; B60T 17/00
(52) U.S. Cl. ............... 340/438; 340/431; 340/453; 340/514; 701/29; 701/35; 701/70; 307/9.1; 303/1; 303/122.02; 303/123
(58) Field of Search ................. 340/431, 438, 340/453, 514, 10.1, 825.69, 825.72, 3.3, 3.32, 3.31, 3.7, 3.71; 701/29, 31, 32, 34, 35; 303/1, 3, 122.02, 122.06, 123, 124; 307/9.1, 10.1

(56) References Cited

U.S. PATENT DOCUMENTS

| | | | | |
|---|---|---|---|---|
| 5,003,476 A | * | 3/1991 | Abe | 73/117.3 |
| 5,488,352 A | * | 1/1996 | Jasper | 340/431 |
| 5,739,592 A | * | 4/1998 | Rigsby et al. | 307/10.1 |
| 5,835,873 A | * | 11/1998 | Darby et al. | 701/45 |
| 6,097,998 A | * | 8/2000 | Lancki | 701/33 |
| 6,114,952 A | * | 9/2000 | Francesangeli et al. | 340/453 |
| 6,382,018 B2 | * | 5/2002 | Knestel | 701/70 |
| 6,553,290 B1 | * | 4/2003 | Pillar | 701/33 |

\* cited by examiner

*Primary Examiner*—Donnie L. Crosland
(74) *Attorney, Agent, or Firm*—Baker & Hostetler LLP

(57) ABSTRACT

A device and method for determining the status of an anti-lock brake system in a tractor-trailer configuration. The device includes a connector that can be connected to the trailer or tractor separately or connected to both the trailer and tractor simultaneously. Once connected the device begins to operate self-sufficiently by monitoring the data transmissions in a communication medium. Initially from monitoring the data transmission, the device detects whether it is attached to the trailer, tractor or both. From this determination, it either continues to monitor or proceeds to transmit data.

22 Claims, 4 Drawing Sheets

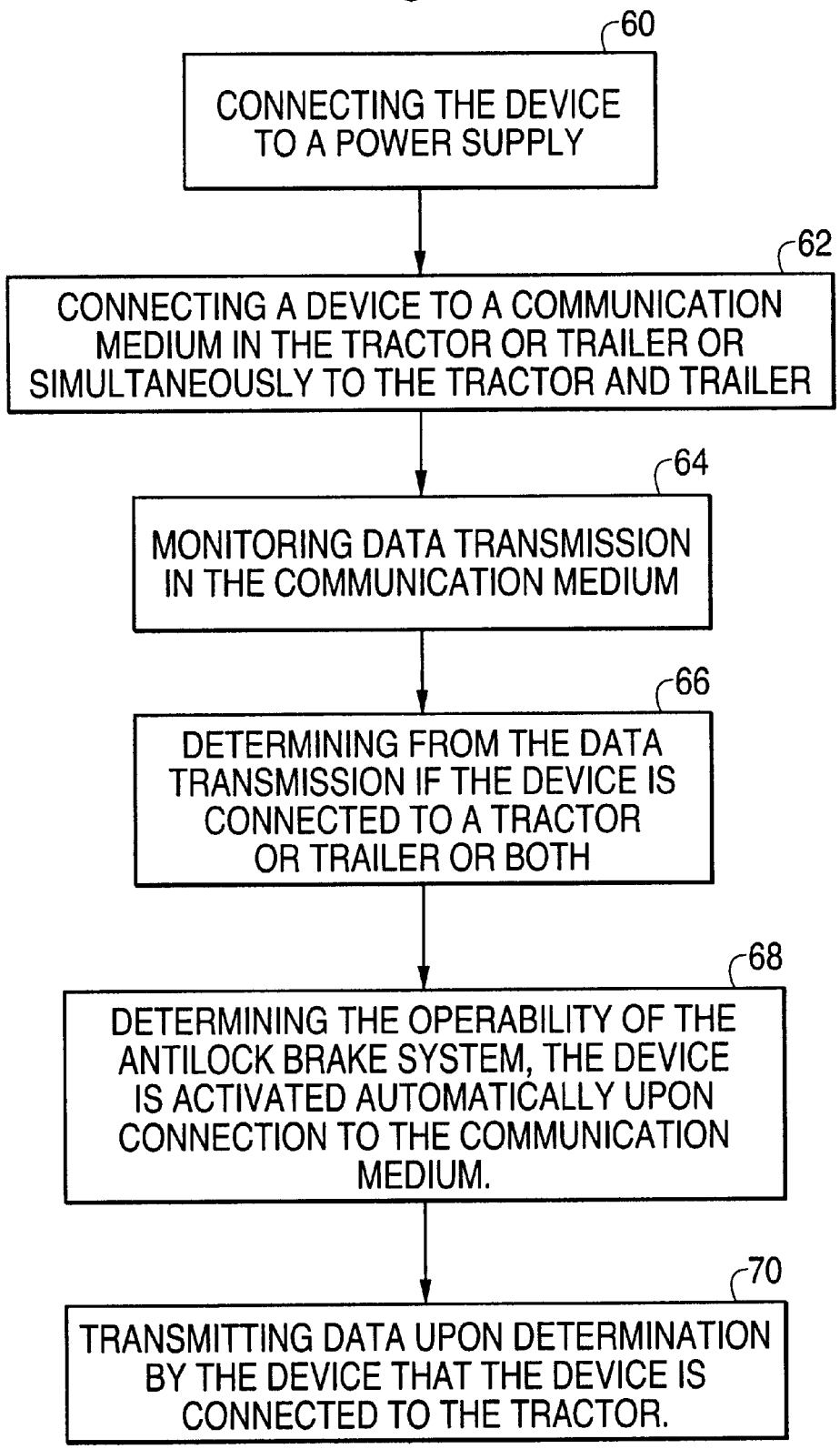

APPARATUS AND METHOD FOR TESTING AN ANTILOCK BRAKE SYSTEM

PRIORITY

This application claims priority to the provisional U.S. patent application entitled, APPARATUS AND METHOD FOR TESTING AN ANTILOCK BRAKE SYSTEM, filed Oct. 23, 2001, having a serial No. 60/330,508 the disclosure of which is hereby incorporated by reference.

FIELD OF THE INVENTION

The present invention relates generally to anti-lock braking systems. More particularly, the present invention relates to the testing of anti-lock braking system in trailers and tractors.

BACKGROUND OF THE INVENTION

Advances in technology have brought about great changes in the operation of braking systems in transportation vehicles. Some of these changes enable braking systems to sense current road conditions and adjust the operability of the brakes in response to these conditions. These systems have been installed on a wide range of vehicles from personal automobiles to single high-volume transportation vehicles such as buses and trucks. With the latter, a need has developed to quickly and accurately test the current condition of these braking systems especially in companies that have a large number of vehicles.

In a conventional brake system without antilock brakes, when the driver presses the brake pedal, fluid, usually oil on cars and smaller trucks and air on large trucks, is forced to the actual brake mechanism at each wheel.

The pressure from the oil forces a stationary braking surface against a rotating surface, which is attached to the wheel. Friction is induced as it slows the rotating wheel. The rotating surfaces are, respectively, drums or rotors. The slowing wheel also slows the vehicle because of friction between the tire and the road surface. A component known, as the "relay valve," is a significant part of an air brake system on a trailer. This component "relays" a control air pressure signal from the driver's brake pedal in the cab to the brakes. A control line, a small diameter tube running the length of the vehicle, becomes pressurized when the driver applies the brakes. A separate source of compressed air also exists. This is the "power" air and a reserve is stored in a tank on the trailer. This power air flows to the brakes to affect the actual braking work. The relay valve isolates the control air signal from the power air.

Conventional brakes systems tend to suffer from driver-induced errors. For example, when driving on wet surfaces, excessive pressure on the brakes could force the wheels to stop rotating and eventually to lock before the vehicle stops. The vehicle does slow down, but directional control is lost, and, depending on which wheel locks, and on the road conditions, the vehicle may spin. To further complicate the problem, drivers attempt to take directional control of the car, which can further exacerbate the problem. Additional complications are dictated by regulation and failure mode considerations.

To overcome this inherent disadvantage of conventional braking systems, antilock brake systems (ABS) have been developed. The ABS is a system that prevents wheel lockup by automatically modulating the brake pressure during an emergency stop. These systems offer significant safety and control advantages and ABS is now in common use on most types of vehicles. ABS prevents wheel lock-up by controlling brake torque so that the tire to road interface makes most use of the available friction while at the same time providing a reasonable level of lateral stabilizing force. In an emergency or a panic braking situation, ABS functions by keeping the brake pressure at a level just below that which would cause the wheels to lock-up. The vehicle remains stable during emergency or panic braking—that is, the vehicle does not spin. In addition, the vehicle remains steerable during emergency or panic braking. In effect, ABS utilizes the available friction between the tires and the road while ensuring that a high side force (perpendicular to the direction of travel of the vehicle) is also available, thus providing vehicle stability and steerability. Stopping distances are shorter than with locked wheel stops under most conditions. Finally, the lifetime of the tire is increased when ABS is used.

A conventional ABS includes a wheel speed sensing mechanism, an electronic control module (ECM) and a modulation system, which controls the brake actuation fluid (air for heavy trucks) pressure. The modulation system consists of one or more modulators and includes a pneumatic control module (PCM).

The wheel speed sensing mechanism, the ECM and the modulation system are additions to the conventional brake system, which, for most vehicle types, remains largely unchanged. The wheel speed sensors determine the speed of the wheels and sends this information, in an electrical format, to the ECM. The ECM analyzes the wheel speed information and, if appropriate, electrically signals the modulation system to prevent wheel lock-up. The modulation system responds to these signals and physically reduces the brake pressure to optimum level for the conditions. As noted above, the modulation system controls the brake air pressure. This control becomes active only during hard braking, and/or slick conditions, where the wheels would have stopped rotating (lock-up) in the absence of an anti-lock brake system.

As one can see, the use of ABS systems have become an integral part of the motorized transportation system. Improvement in braking is achieved using ABS systems only if the systems are operating appropriately. The operation of ABS systems must therefore be maintained and monitored. Therefore, there is a need to quickly determine the operability and status of an ABS system.

Accordingly, it is desirable to provide an apparatus that is able to determine the operability and status of an ABS system. The system needs to be discrete enough to use on multiple trailers, vehicles or cars with minimum amount of effort.

SUMMARY OF THE INVENTION

It is therefore an aspect of the present invention to provide a device that obtains the status of an anti-lock brake system of a trailer.

It is another aspect of the present invention to provide a device that obtains the status of an anti-lock brake system of a tractor.

It is another aspect of the present invention to provide a device that automatically obtains the status of an anti-lock brake system upon connection of the device to a communication medium.

It is aspect of the present invention to provide a method for obtaining the status of an anti-lock brake system of a truck tractor or trailer.

In one aspect of the invention a novel device that activates automatically upon connection to the anti-lock brake communication medium as is provided. The device for testing the status of an anti-lock brake system in a tractor trailer configuration includes a connector that links the device to a communication medium in a trailer or tractor or simultaneously to the tractor and trailer. A receiver is linked to the connector wherein the receiver detects data transmissions in the communication medium and a processor is linked to the receiver wherein the processor monitors the data transmissions at the receiver and determines whether the device is linked to either the trailer or tractor. The processor determines the status of the anti-lock brake system. The processor is activated automatically on being linked to the communication medium, which for the truck trailer or tractor is the electronic control unit (ECU).

In another aspect of the invention, the device can further includes a transmitter that is linked to the processor and transmits data through the communication medium upon detection by the processor that the device is linked to a trailer. At this point, the transmitter transmits specific codes to the truck tractor anti-lock brake system. In the preferred embodiment, the anti-lock brake system indicator light is flashed, meaning the system is operational.

In yet another aspect of the present invention, a device for testing the status of an anti-lock brake system in a tractor trailer configuration includes a means for connecting the device to either a tractor or trailer or simultaneously to a tractor and trailer, a means for detecting data transmissions in a communication medium. The means for detecting is linked to the means for connecting. Another element is a means for monitoring the data transmission received at the means for detecting, The means for monitoring is activated automatically upon connection the communication medium. The device can also be comprised of a means for transmitting in the communication medium and a means for powering that is connected to the device wherein the means for powering can be a battery.

In yet another aspect of the present invention, a method for testing the status of an anti-lock brake system in a tractor trailer configuration comprises the steps of connecting a device to a communication medium in the tractor or trailer or simultaneously to the tractor and trailer, monitoring the data transmissions in the communication medium through the device, and determining from the data transmission if the device is connected to a tractor or trailer or both and determining the operability of the anti-lock brake system. The device activates automatically upon connection to the communication medium.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 4 is a flowchart illustrating the steps that may be followed in accordance with one embodiment of the present inventive method or process.

DETAILED DESCRIPTION OF PREFERRED EMBODIMENTS OF THE INVENTION

A preferred embodiment of the present invention provides a device that returns the status and operability of an anti-lock brake system without the need of an added device. The preferred embodiment is coupled or linked together with the antilock brake communication system and determines the operability of the antilock brake system. The device does not need to be linked or attached to an external device to aid in determining the operability of the antilock brake system.

Figure 1:
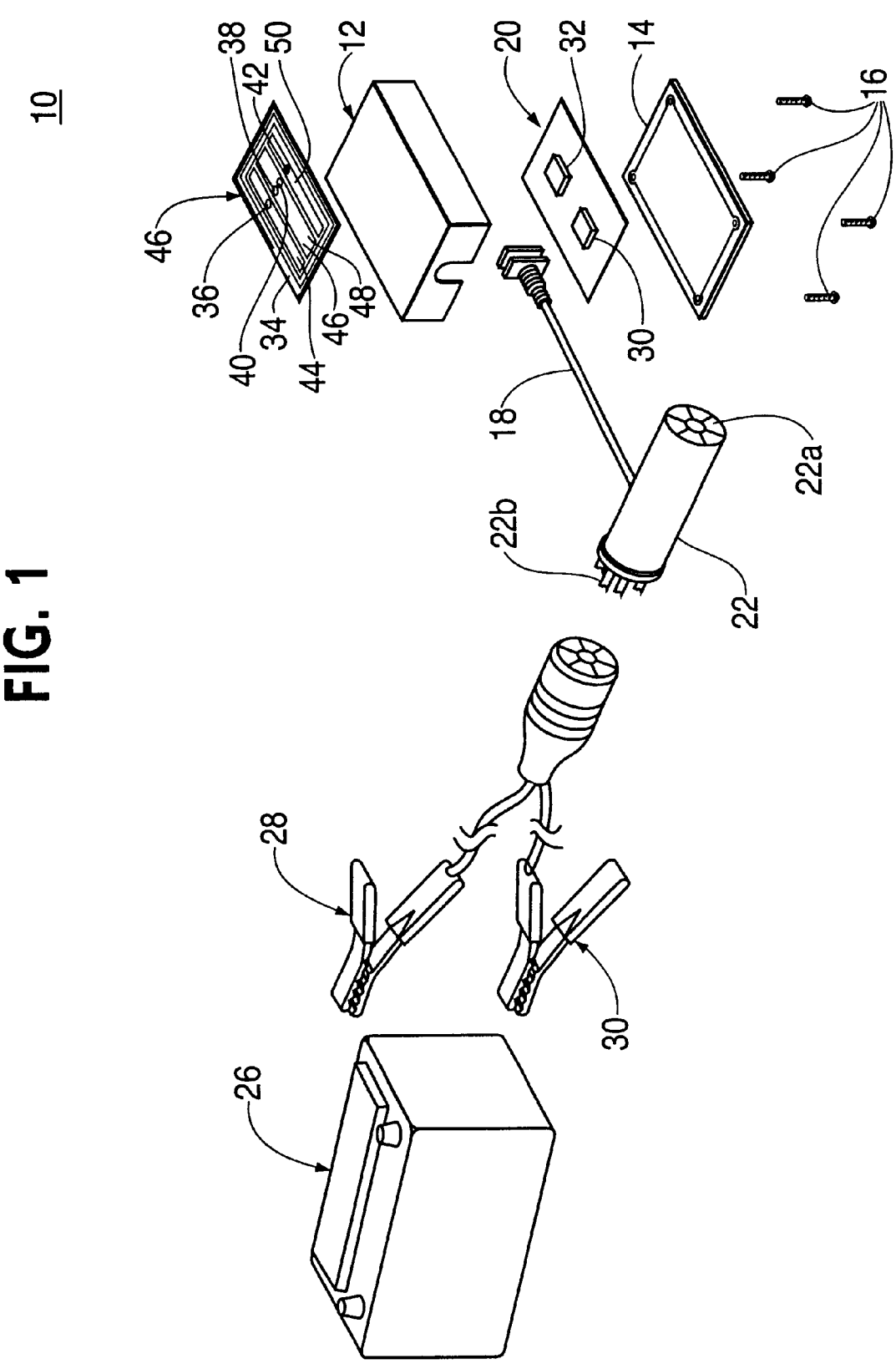
FIG. 1 provides an exploded view illustrating several elements of a preferred embodiment of the present invention.

A preferred embodiment of the present inventive device and method is illustrated in FIG. 1. The device 10 is comprised of an upper housing 12 and a lower housing 14. The upper 12 and lower 14 housing are fastened with screws 16. Extending from the housing is a two-wire interface 18, which is attached to the circuit board 20. The two-wire interface 18 is linked to a connector 22 that is adaptable for testing anti-lock brake systems of a tractor or trailer or both simultaneously. The connector includes a female end 22a and a male end 22b. The female end 22a is plugged-in or linked to the electronic control unit (ECU) of the antilock brake system. The ECU is the medium through which the anti-lock brake system communicates its operability and status.

The male end 22b of the connector serves a multi-purpose function. First, it connects to the ECU of the trailer. The tractor end is where the device 10 gets its power. Therefore, the device 10 does not need a stand-alone power supply if it is connected to the tractor either alone or simultaneously with the trailer.

The male end 22b also serves the purpose of linking the device 10 to the ECU of the trailer and is therefore able to determine the operability and status of the antilock brake system. The male end 22b plugs directly into the tractor ECU and from there the device 10 determines on its own what it is attached to, the trailer or the tractor.

The male end 22b is also used to supply power to the device 10 in the absence of power from the tractor. The male end 22b is connected to a female power connector 24, which is connected to a power source 26. In the preferred embodiment, the power source 26 is a portable battery that is connected via clamps 28, 30. Using the device 10 with a portable battery is ideal in situations where a transportation company has a large number of trailers. With the device 10, a mechanic is able to complete a test on a number of trailers in a short period of time to determine the operability of the anti-lock brake systems. This provides the company with an inexpensive and accurate system of testing the brakes. This also permits the company to identify potentially hazardous situations accurately and efficiently.

The connector 22 is linked to a receiver 30 through the two-wire interface 18, which is linked through the circuit board 20 to an integrated chip (IC) 32. It is the IC 32 that allows the device 10 to interface with ECU. In the preferred embodiment, the IC 32 is the Intellon P485, which is currently the standard in the industry. However, one of skill in the art recognizes the multiple configurations available to achieve interface operability between the ECU and the device.

The interface between the ECU and the device 10 allows the device 10 to monitor and determine the operability of the anti-lock brake system. To achieve this, the preferred embodiment contains a receiver 30 to monitor the data transmission in the ECU. For example, once the device 10 is interfaced with ECU, the receiver 30 begins almost instantaneously to monitor the anti-lock brake system communication. The device 10 begins to ascertain from the transmission whether it is connected to the tractor or trailer. Most devices on the market today, require the user to tell the system whether it is hooked to the trailer or the tractor.

The receiver 30 listens to the data transmissions. If there is no data communication in the ECU, a processor 32 in the device 10 is encoded with a software program to make the determination that it is hooked to the tractor. If there is communication to the ECU, then the processor 32 determines that it is hooked to the trailer. Both of these determinations are based upon how the ECU functions. For example, when the trailer emits a constant data transmission, it is through this transmission that a trailer is able to indicate to the driver or mechanic the operability of the ABS device 10. Initially, the device 10 listens for data in the trailer, rather than transmit data. The communication transmissions in the ECU monitored by the device 10 are the binary codes for light-on or the light-off indicator. These codes are sent from the anti-lock brake system controller to the tractor dash light.

At the determination that the device 10 is hooked to a trailer, the processor 32 instructs the receiver to continue to monitor the data transmissions. The data transmissions are relayed to the processor 32, which analyzes the data and issues a report through the indicator 34. The indicator 34 in the preferred embodiment is a series a light emitting diodes (LEDs) 36, 38, 40, 42. The LEDs are placed next to text, which indicates to the user what the processor has determined the status of the antilock brake system of the trailer or tractor or both to be.

Figure 2:
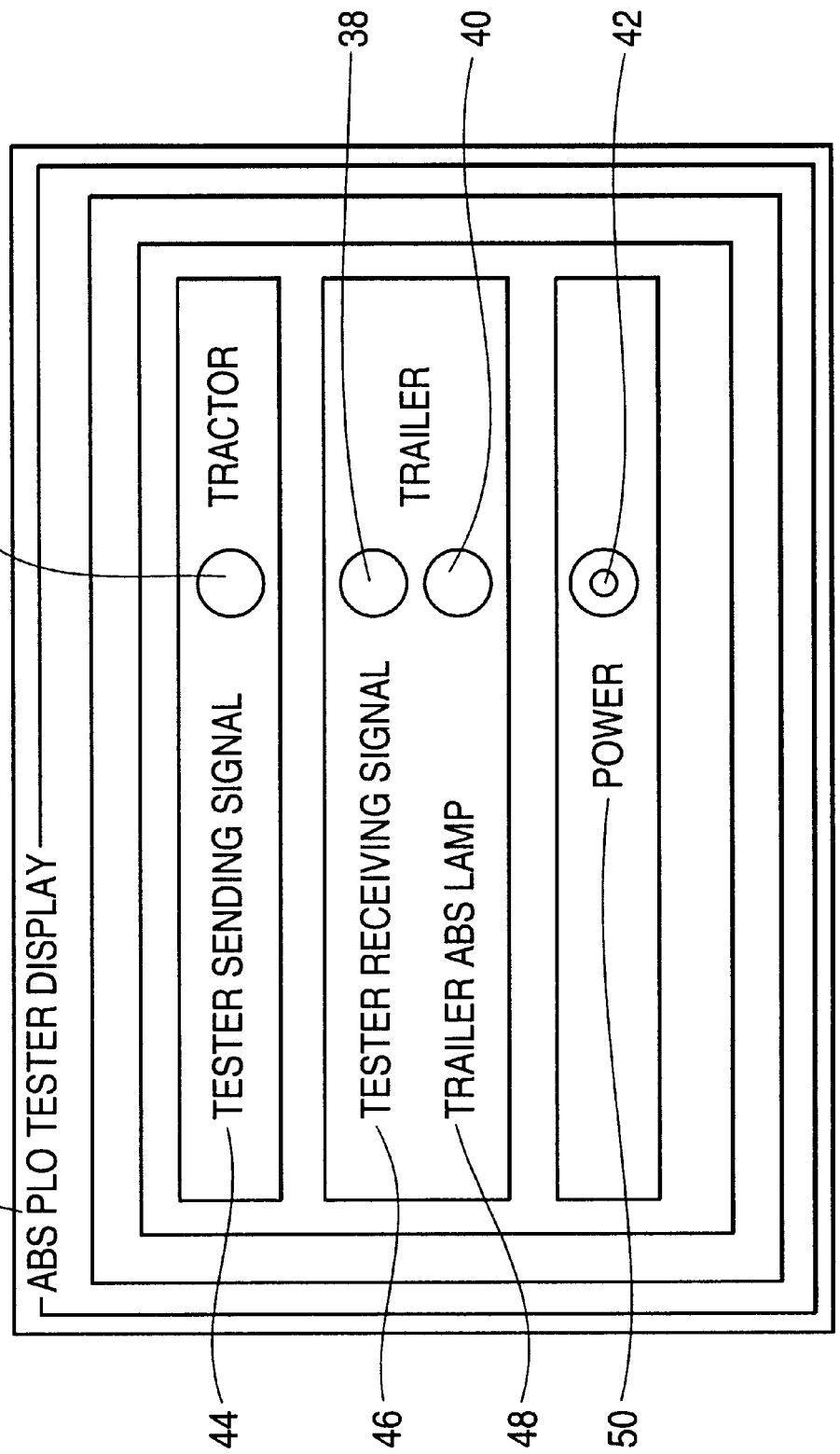
FIG. 2 provides of view of the indicator panel of the preferred embodiment.

FIG. 2 is a view of the indicator panel of the preferred embodiment. The indicator 34 is placed on the device 10 in a location that is convenient for the user of the system to visualize while in operation. The indicator 34 consists of text 44, 46, 48, 50 and next to that text are LEDs 36, 38, 40, 42 that indicate to the user what the device 10 has determined once it is activated.

For example, if the device 10 is connected only to the trailer, without the aid of tractor power, then it must be connected to a separate power source 26. Once connected, the device 10 takes approximately two seconds to initialize. All the LEDs on the tester are on for that time. The device 10 will monitor the power line for communications from the trailer anti-lock brake system controller. If communication is detected, the device's tester receiving signal 38 activates. The device's trailer ABS lamp 40 activates if it is receiving a light on command (ABS fault), the ABS Lamp 40 is not activated if it is receiving an off command (ABS OK). If the device's tester receiving signal light 38 does not stay on during this test, the anti-lock brake system controller or the controller's wiring is faulty. Additionally, if the device's trailer ABS lamp 40 is activated or flickering, the anti-lock brake system is faulty.

The LED 38 indicates to the user whether it is actually receiving communication from the communication medium or not. If the device 10 detects communication from the trailer, the device's tester receiving signal light 38 activates. The trailer ABS lamp 40 indicates the ABS status on the device 10.

If indeed the device 10 is receiving communication from the trailer, the signal is then fed to the processor 32, which determines whether the communication being transmitted by the device 10 is coded for a positive or negative status of the antilock brake system. A faulty system determination by the processor 32 is indicated by activating the trailer ABS lamp 40.

When the user connects the device 10 to the tractor only, the device 10 takes approximately two seconds to initialize. All LEDs on the device 10 are turned on for that time. Tester sending signal light 36 turns on and the tractor's dash light flashes at a rate of once every two and one half seconds. If the tractor dash light does not flash, the tractor dash light control circuit is faulty.

When the user connects the device 10 to both the trailer and tractor simultaneously, the tester, as in the other instances, takes approximately two seconds to initialize. All LEDs are on for that time. The device 10 monitors the power line for communications from the trailer ABS controller. If any communication is detected, then the device's receiving signal 38 is activated. The trailer ABS lamp 40 is activated if a fault signal is received. This indicates that the trailer is not functioning correctly. If no signal is present, then the device, in response, begins to transmit to the tractor, which activates the tester sending signal LED 36 The transmission results in the flashing of the tractor's trailer ABS lamp located on the dash.

The following tables and test procedures summarize the operation of the device 10 and the indicator.

TABLE 1

Tractor Only

| Condition | Tractor Dash Light | Testor Sending Signal 34 | Tester Receiving Signal 38 | Device Trailer ABS Lamp LED 40 | Device Power Led 42 |
|---|---|---|---|---|---|
| Tractor OK | Flash ½.5 sec | On | Off | Off | On |
| Tractor Fault | Off | On | Off | Off | On |

Tractor Only
1. Turn the ignition/power to trailer off
2. Connect the tester to the tractor.
3. Turn the ignition/power to trailer on. The device will take approximately two seconds to initialize. All LEDs on the device are on for that time.
4. The tractor's dash light should blink at the rate of once every two and one-half seconds and the device's tester sending signal 36 will turn on.

If the tractor dash light does not flash and the device's tester sending signal is on, the tractor dash light control circuit is faulty.

TABLE 2

Tractor Only

| Condition | Tractor Dash Light | Testor Sending Signal 34 | Tester Receiving Signal 38 | Device Trailer ABS Lamp LED 40 | Device Power Led 42 |
|---|---|---|---|---|---|
| Trailer OK | N/A | Off | On | Off | On |
| Trailer Fault | N/A | Off | Off | On | On |
| Trailer No Comm | N/A | On | Off | Off | On |

Trailer Only
1. Connect device to the trailer.
2. Connect an external device/trailer power supply.
3. The device will take approximately two seconds to initialize. All LEDs on the tester are on for that time.
4. The device will monitor the power line for communications from the trailer anti-lock brake system control. If communication is detected, then the device's tester receiving LED 38 turns on.

If the device's tester receiving signal 38 does not stay on during the test, the ABS controller or the controller's wiring is faulty. If the trailer ABS lamp 40 is activated, the anti-lock system is reporting a fault.

TABLE 3

Tractor and Trailer

| Condition | Tractor Dash Light | Testor Sending Signal 34 | Tester Receiving Signal 38 | Device Trailer ABS Lamp LED 40 | Device Power Led 42 |
|---|---|---|---|---|---|
| Trailer OK | Off | Off | On | Off | On |
| Trailer Fault | On | Off | On | On | On |
| Trailer No Comm | Off/ Flash ½ s sec | On | Off | Off | On |

Tractor and Trailer (Device In-line)
1. Turn the ignition/power to trailer off.
2. Connect the tester in-line with the tractor and trailer.
3. Turn ignition/power to trailer on.
4. The device 10 will take approximately two seconds to initialize. All LEDs on the device are on for that time.
5. The device 10 will monitor the power line for communications from the trailer anti-lock brake system controller. If communication is detected, then the device's tester receiving signal light 38 turns on.
6. The device's trailer ABS lamp 40 is on if it is receiving light-on commands (anti-lock brake system fault). The light is off it is receiving light-off commands (anti-lock brake system is working). See Trailer Only.
7. If communications are not detected, then the trailer anti-lock brake system is inoperative. The tractor's dash light blinks at the rate of once every two and one-half seconds in addition to the device's tester sending signal 34 being activated.

Figure 3:
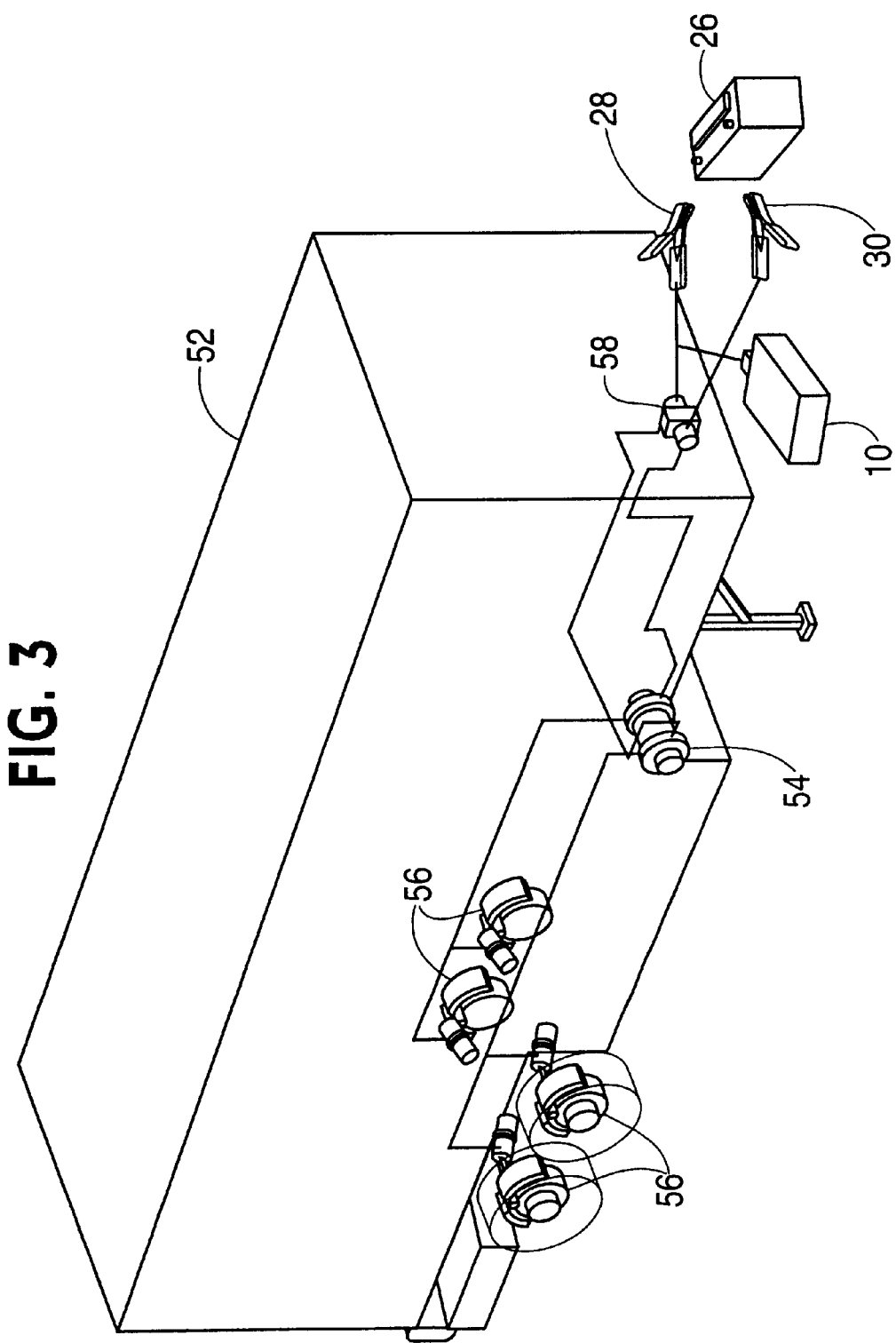
FIG. 3 provides a perspective view illustrating the preferred embodiment with the use of a truck trailer.

FIG. 3 provides a perspective view illustrating the preferred embodiment with the use of a truck trailer. The device 10 is connected to a trailer 52, which consists of a controller 54 and four-sets of anti-lock brake systems 56. The device 10 is connected to the trailer 56 through the communication medium 58, which is usually the ECU. Due to the lack of a power emitting from the tractor, a power source 26 is connected to the device 10 through the power source clamps 28, 30. As one cannot note from this drawing, the device 10 is portable and operable by itself. In does not necessitate the need for additional devices in order to operate.

FIG. 4 is a flowchart illustrating the steps that may be followed in accordance with one embodiment of the present inventive method or process. The first step in the process is connecting 60 the device to a power supply 26. The device 10 can be connected to power supply when connected to either the tractor or trailer. It is envisioned that in most instances that the device is powered from the tractor when checking the tractor. However, it is not necessary to supply power from the tractor.

A power source 26 is needed when testing the trailer alone. A portable supply allows a user ease of use of the device over a large number of trailers at a single time.

The next step in the process is connecting 62 the device 10 to a communication medium in the tractor or trailer or simultaneously to the tractor and trailer. This enables the device to be used on either the tractor or trailer alone or on conjunction with each other. Once the device is connected, the next step is monitoring 64 the data transmissions in the communication medium with the device 10. The next steps are determining 66 from the data transmission if the device is connected to a tractor or trailer or both and determining 68 the operability of the anti-lock brake system. On systems available in market place, the system is instructed whether it is connected to the trailer or the tractor. Once the device 10 has determined to which it is connected, it determines the operability of the anti-lock brake system by listening for specific data broadcast over the communication medium.

The next step in the method is transmitting 70 data upon determination by the device 10 that it is connected to the tractor. The processor 32 in the device 10 determines that it is connected to a tractor from the data or lack of data being transmitted. Once it has determined that the device 10 is not connected to a trailer, the device begins to transmit in an attempt to test the tractor dash light. In essence, the device is acting like a trailer and instructing the tractor to either turn the antilock brake system light on, Fault, or to turn the anti-lock brake system off, No Fault.

The many features and advantages of the invention are apparent from the detailed specification, and thus, it is intended by the appended claims to cover all such features and advantages of the invention, which fall within the true spirits, and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A portable device for testing the status of an anti-lock brake system in a vehicle, comprising:
   a connector that links the device to a communication medium in vehicle; a receiver, linked to the connector, that detects data transmissions in the communication medium;
   a processor, linked to the receiver, that monitors the data transmissions at the receiver and determines what type of vehicle the device is connected and determines the status of the anti-lock brake system based upon the vehicle determination.

2. The device of claim 1, wherein the vehicle is a tractor.

3. The device of claim 2, wherein the also includes a trailer.

4. The device of claim 3, further comprising a transmitter that is linked to the processor and transmits data through the communication medium.

5. The device of claim 4, wherein the transmitter is activated upon detection by the processor that the device is linked to the tractor.

6. The device of claim 5, wherein the transmitter transmits signals to flash the ABS indicator in the tractor.

7. The device of claim 3, wherein the communication medium is the electronic control unit.

8. The device of claim 1, further comprising a power supply that is connected to the device to supply power.

9. A portable device for testing the status of an anti-lock brake system in a vehicle, comprising:

means for connecting the device to the vehicle;

means for detecting data transmissions in a communication medium, the means for detecting is linked to the means for connecting; and means for determining what type of vehicle the device is attached;

means for determining the status of the anti-lock brake system based upon the type of vehicle determination, the means for determining is linked to the means for detecting.

10. The device of claim 9, further comprising a means for transmitting in the communication medium.

11. The device of claim 9, further comprising a means for powering that is connected to the device.

12. The device of claim 11, wherein the means for powering is a battery.

13. The device of claim 10 wherein the means for transmitting is a transmitter.

14. The device of claim 9 wherein the means for detecting is a receiver.

15. The device of claim 9 wherein the means for monitoring is processor.

16. The device of claim 10 wherein the means for transmitting is activated upon determination by the means for monitoring that the device is connected to a trailer.

17. A method for testing the status of an anti-lock brake system in a vehicle, comprising:

connecting a portable device to a communication medium in a vehicle, the device is activated automatically upon connection to the communication medium;

monitoring the data transmissions in the communication medium through the device;

determining from the data transmission what type of apparatus the device is connected and determining the operability of the anti-lock brake system in accordance with the determination of the apparatus.

18. The method of claim 17 further comprising the step of transmitting data upon a determination by the device that it is connected to the vehicle.

19. The method of claim 18, wherein the vehicle is a tractor.

20. The method of claim 17 further comprising the step of connecting the device to a power supply.

21. The method of claim 17 wherein the device is comprised of a receiver to monitor the data transmission.

22. The method of claim 20 wherein the device is comprised of a processor to determine from the data transmissions that the device is connected to a trailer.

* * * * *